United States Patent [19]

Nakamura et al.

[11] Patent Number: 4,610,137
[45] Date of Patent: Sep. 9, 1986

[54] REGENERATIVE GAS TURBINE CYCLE

[75] Inventors: Hiromi Nakamura; Takehiko Takahashi, both of Chiba; Norio Narazaki; Kazuo Yamamoto, both of Kanagawa; Norio Sayama, Chiba, all of Japan

[73] Assignee: Mitsubishi Gas Chemical Company, Inc., Tokyo, Japan

[21] Appl. No.: 744,238

[22] Filed: Jun. 13, 1985

Related U.S. Application Data

[62] Division of Ser. No. 448,322, Dec. 9, 1982, Pat. No. 4,537,023.

[30] Foreign Application Priority Data

Dec. 10, 1981 [JP] Japan ................. 56-199362
Dec. 10, 1981 [JP] Japan ................. 56-199364

[51] Int. Cl.$^4$ ................. F02C 3/30; F02C 7/143
[52] U.S. Cl. ................. 60/39.511; 60/39.53; 60/39.59; 60/728
[58] Field of Search ............ 60/39.05, 39.53, 39.55, 60/39.58, 39.59, 728, 736, 39.511

[56] References Cited

U.S. PATENT DOCUMENTS

| | | | |
|---|---|---|---|
| 2,115,338 | 4/1938 | Lysholm | 60/39.05 |
| 2,186,706 | 1/1940 | Martiuka | 60/728 |
| 2,602,289 | 7/1952 | Anxionnaz et al. | 60/736 |
| 3,379,009 | 4/1968 | Sharp et al. | 60/736 |
| 3,877,218 | 4/1975 | Nebgen | 60/728 |
| 4,418,527 | 12/1983 | Schlom et al. | 60/728 |
| 4,448,018 | 5/1984 | Sayama et al. | 60/39.511 |

FOREIGN PATENT DOCUMENTS 286978 11/1952 Switzerland ................. 60/39.53

*Primary Examiner*—Louis J. Casaregola
*Attorney, Agent, or Firm*—Cushman, Darby & Cushman

[57] ABSTRACT

A regenerative gas turbine cycle wherein heat recovery is carried out by a mixture of air/steam which is obtained by contact between water and compressed air, the compressed air being compressed by a compressor for compressing gas using air or air based gas as a combustion supporting/working medium gas. The cycle includes the improvement whereby mixture of air/steam and liquid phase cooled water is obtained through contact between the compressed air and heated water which is used as heat recovering medium; the cooled water being used as heat recovering medium not only for heat recovery of turbine exhaust gas but also, for (a) intercooling of the compressor, and/or
(b) precooling of compressed air for the contact operation.

Water corresponding to the amount of water which contacts the compressed air and is lost by evaporation is added to the liquid phase water for contact or heat recovery as it is or after use as a heat recovering medium.

2 Claims, 4 Drawing Figures

REGENERATIVE GAS TURBINE CYCLE

This is a division, of application Ser. No. 448,322, filed Dec. 9, 1982 U.S. Pat. No. 4,537,023.

FIELD OF THE INVENTION

The present invention relates to a water injection type regenerative gas turbine cycle based on a novel method of heat recovery, and more particularly, to a regenerative gas turbine cycle in which heat recovery is carried out by a mixture of air/steam which is obtained by contact between water and a part of or the whole of compressed air, said compressed air being compressed by a compressor for compressing gas using air or air based gas as a combustion supporting/working medium gas;

the mixture of air/steam and cooled water being obtained through the contact between the compressed air and heated water which is used as heat recovering medium;

said cooled water being used as heat recovering medium not only for heat recovery of turbine exhaust gas but also, (a) intercooling of the compressor, and/or (b) precooling of compressed air for the contact operation; and supplying water corresponding to the amount of water which contacts the compressed air and is lost by evaporation being added to the water for contact operation or heat recovery as it is or after using as a heat medium.

As will later be explained, the gas turbine cycle on the principle of this invention can provide thermal efficiency higher than 49% (LHV) at turbine inlet temperature of 1,000° C., under the practical conditions. This means an increase in thermal efficiency to approximately 2 times that for conventional simple gas turbine cycle, with a corresponding reduction of 50% in fuel consumption.

BACKGROUND OF THE INVENTION

Conventionally, the heat of the turbine exhaust gas in gas turbine cycle has been recovered by the preheating of air or withdrawal of refrigerative energy by means of absorbent type refrigerant or generating of steam by waste heat boiler. In addition, in some prior art gas turbine cycle, preheating of air is carried out through mixture of air/steam which is obtained by injection of water into compressed air.

The following literatures teach the regenerative gas turbine cycle of water injection type; The U.S. Pat. Nos. 2,095,991, 2,115,112, 2,115,338, 2,678,532 and 2,869,324, Swiss Pat. No. 457039, and French Pat. No. 1007140.

Other literatures reporting on these patents include "GAS TURBINES WITH HEAT EXCHANGER AND WATER INJECTION IN THE COMPRESSED AIR", Combustion vol. 44, No. 6, December 1972, p. 32–40, by N. Gasparovic et al. (hereinafter referred to as report A) and Combustion vol. 45, No. 6, December 1973, p. 6–16 (hereinafter referred to as report B).

Each of the above-mentioned patents discloses the method of heat recovery by the use of a mixture of compressed air/steam with a description of the process of injection water to be mixed with the compressed air or with the intermediately compressed air. Reports A and B state in reference to these patents that the increase in thermal efficiency attainable with each of them has been proved to be about 1.5 times that for conventional simple gas turbine cycle in spite of great increase in the specific power. These achievements are not very satisfactory; rather they are poor from the viewpoint of the utility and practicability of general power generation as reflected in the concept of a combined cycle of gas turbine and steam turbine. With the recent sky-rocketing increases in fuel prices (by 20 times in 10 years), the direction of the development of a more effective power generating plant capable of a significant increase in thermal efficiency has taken a turn toward the possibility of embodying a combined cycle of gas turbine and steam turbine.

The applicants of the present invention has found that in the water injection type regenerative gas turbine cycle an increase of thermal efficiency is achieved by the system in which heat recovery of turbine exhaust gas is carried out by multi-phase mixture of compressed air/water/steam which is obtained by injection of water into a part of or the whole of compressed air and intercooling of the compressor is accomplished by this water, and filed several applications such as Japanese patent application No. 55-155399 on the basis of the above discovery.

Further studies on the manner of water injection, heat recovery, and the method of production of the cooling medium have led to the additional development of the above mentioned regenerative gas turbine cycle. The improved cycle comprises contact operating means such as exchanging tower in which direct contact between the compressed air and heated water used as a heat recovering medium occur so that both heat and mass transfer is carried out, said liquid phase cooled water by the contact being used as heat recovering medium for heat recovery of turbine exhaust gas and intercooling of the compressor, and supplement water corresponding to the amount of water which contacts the compressed air and evaporates to transform into steam constituting the mixture is also used for intercooling of the compressor, and further cooling of the compressed air for contact operation is carried out by a part of the water which is cooled by the contact operation. This cycle has been found to achieve an increase of thermal efficiency and is presented in this invention. It has also been proved that the values of thermal efficiency obtainable by this cycle are higher in comparison with those expected of the above mentioned combined reheat cycle of gas turbine and steam turbine.

SUMMARY OF THE INVENTION

In more detail, the present invention is concernted with a regenerative gas turbine cycle in which heat recovery is carried out by a mixture of air/steam which is obtained by contact between water and a part of or the whole of compressed air, said compressed air being compressed by a compressor for compressing gas using air or air based gas as a combustion supporting/working medium gas;

the mixture of air/steam and cooled water being obtained through the contact between the compressed air and heated water which is used as heat recovering medium;

said cooled water being used as heat recovering medium not only for heat recovery of turbine exhaust gas but also, (a) intercooling of the compressor, and/or (b) precooling of compressed air for the contact operation; and supplying water corresponding to the amount of water which contacts the compressed air and is lost by evaporation being added to the water for contact operation or heat recovery as it is or after using as a heat medium.

According to the present invention, as has been described above, in the regenerative cycle water that has been cooled by the contact between the heated water and the compressed air is used for (a) intercooling of the compressor and/or (b) precooling of the compressed air for the contact operation so that water at lowest possible temperature can be obtained and better heat recovery in the regenerator is accomplished.

DETAILED EXPLANATION OF THE INVENTION

Preferred embodiments of this invention will hereinunder be described in conjunction with the flowsheets of the attached drawings.

Figure 1:
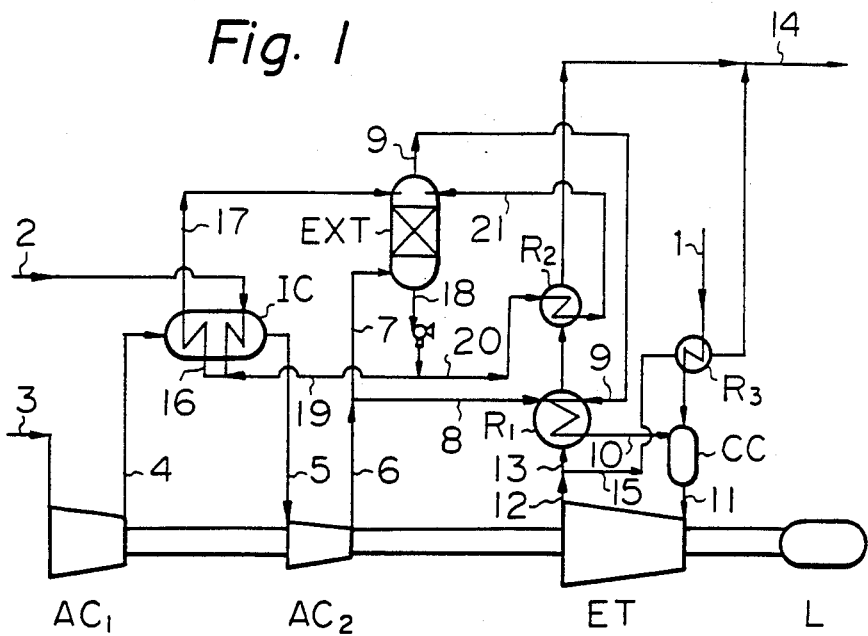
FIGS. 1–4 illustrate four alternative embodiments of the present invention.

FIG. 1 is a flowsheet showing one embodiment in accordance with the present invention embodying the method (a) described above, and comprises a contact type exchanging tower (hereinafter called the exchanging tower) intended to allow the compressed air to contact the water therein, three regenerators, an intercooler, two air compressors and a turbine. Ambient air (3) is intaked by the first compressor ($AC_1$) in which the air undergoes adiabatic compression for admission to the intercooler (IC) through a conduit (4). The air or so called intermediate compression stage air (5) after being cooled by the intercoller (IC), is further compressed adiabatically by the second compressor ($AC_2$) for discharge into a conduit (6). A part of or the whole of compressed air is introduced to the lower part of the exchange tower (EXT) through a conduit (7) while the remaining air is routed into the high temperature regenerator ($R_1$) by way of a conduit (8). The exchanging tower (EXT) receives at its upper part water already heated by the intercooler (IC) and the low temperature regenerator ($R_2$), respectively by way of passageways (17) and (21), and allowed to directly contact the compressed air passed into the lower part of the exchange tower through the conduit (7). In this way the exchange tower achieves heat and mass transfer. As consequence, normally fully, or slightly less, saturated mixtures of air/steam come up to the top and make their way through a conduit (9) whereas the water, while being further cooled, gathers at the bottom and goes out through a conduit (18). This cooled water passed from the bottom of the exchange tower (EXT) into the conduit (18) is introduced as the cooling medium to the intercooler (IC) and the low temperature regenerator ($R_2$), respectively by way of passageways (19) and (20). That portion of the water allowed to contact the compressed air in the exchange tower which, upon evaporation, is lost to the compressed air to form a mixture of air/steam but is replaced by the water. Thus the water is admitted through a pressurized water pipe (2) to the intercooler (IC) as the cooling medium in which this supplying water is mixed with the water that has flown in through the conduit (16) to so achieve replenishment of the water amount. On the other hand, the mixture of compressed air/steam that emerges at the top of the exchanging tower (EXT) to flow into the conduit (9) is introduced to the high temperature regenerator ($R_1$) to blend with the compressed air present that is passed through the conduit (8), and is, after having undergone a heat transfer there, admitted to the combustion chamber (CC) through a conduit (10). The fuel is introduced through a conduit (1) and, after being preheated by the regenerator ($R_3$), is routed into the combustion chamber (CC) in which it is converted to combustion gases with the required temperature for admission to the expansion turbine (ET) through a conduit (11). In the turbine the combustion gas undergoes adiabatic expansion to generate energy enough to drive the first and the second air compressors ($AC_1$) and ($AC_2$), and the load (L) to which this turbine is linked, and finally are discharged as exhaust gas from the turbine through a conduit (12). A portion of the exhaust gas is routed through a conduit (15) to the preheater or regenerator ($R_3$) while the remaining exhaust gas is passed through a conduit (13) first to the high temperature regenerator ($R_1$) and then to the low temperature regenerator ($R_2$) to give off its heat and there in turn. The gas, after leaving the regenerators, turns to low temperature waste gas. It is to be noted that the design of a gas turbine should require the additional use of sealing air for the air compressors ($AC_1$) and ($AC_2$), and the turbine (ET) and of cooling air to cool the turbine (ET). However, since the gas turbine cycle according to the present invention can produce compressed air at low temperature, it is possible to reduce the amount of the compressed air used for cooling the turbine to a larger extent than is possible with conventional gas turbine cycles. This is an additional feature of this invention that serves to further enhance the thermal efficiency of the gas turbine cycle.

Figure 2:
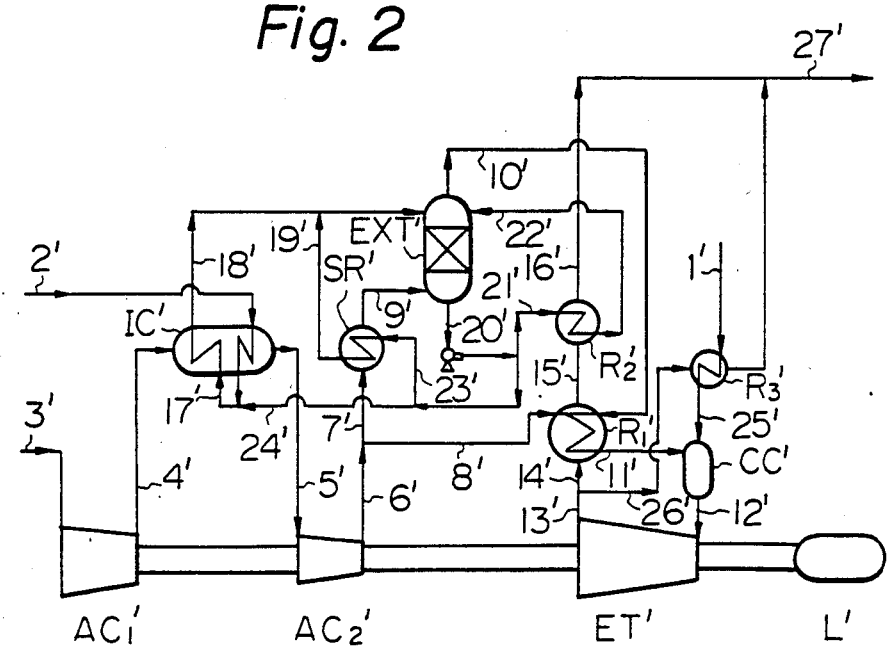
Figure 3:
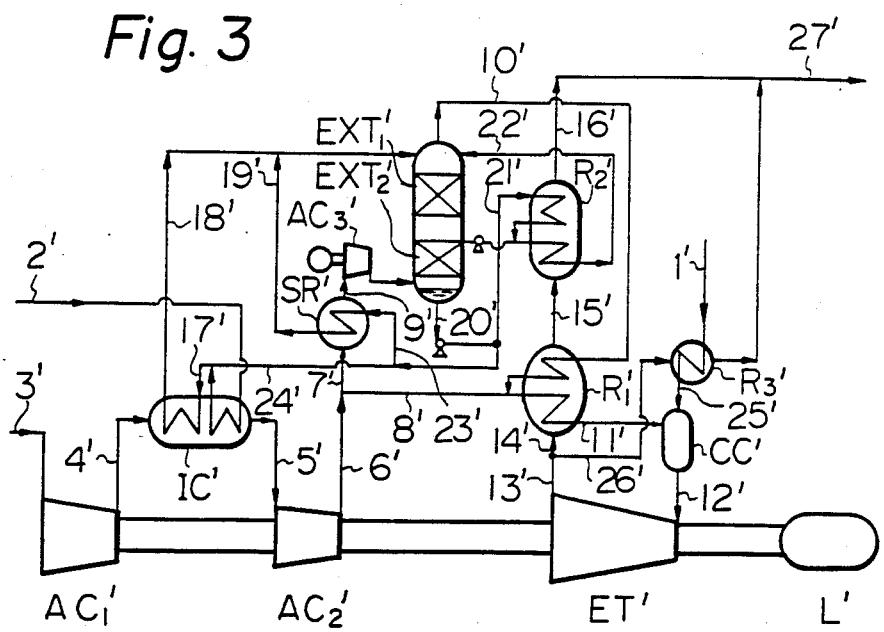

FIGS. 2 and 3 are flowsheets showing another embodiment in accordance with the present invention embodying both the methods (a) and (b) described above, and FIG. 2 is a flowsheet representing a gas turbine that comprises an exchanging tower, three regenerators, a heat exchanger (hereinafter called the self-heat-exchanger) intended to cool the compressed air which is being used for contact operation, an intercooler, two compressors, and a turbine.

FIG. 3 is a modification of FIG. 2 in which two-stage exchanging tower ($EXT'_1$ and $EXT'_2$) is used instead of one exchanging tower (EXT') in the first embodiment. Further, the regenerator ($R'_2$) which performs absorption of the turbine exhaust gas heat is designed, in this embodiment, to perform the heat transfer in two stages.

Referring first to FIG. 2, ambient air (3') is intaked by the first air compressor ($AC'_1$) in which the air undergoes adiabatic compression for admission to the intercooler (IC') through a conduit (4'). The air, after being cooled by the cooling water (17') in the intercooler which receives water (24') from the exchange tower (EXT') while being replenished by a pressurized water pipe (2'), is admitted through a conduit (5') to the second air compressor ($AC'_2$) in which the air, after being subjected to further adiabatic compression, is converted to compressed air (6'). A portion of this compressed air (6') is, as required, routed to the high temperature regenerator ($R'_1$) by way of a conduit (8'). The remaining compressed air is introduced through a conduit (7') to the self-heat-exchanger (SR') for cooling and, leaving the self-heat-exchanger, is introduced into the exchanging tower by way of a conduit (9'). The exchanging tower (EXT') is designed to receive water that is used as heat recovering medium in regenerative cycles and has been heated from the regenerator (R'$_2$), the self-heat exchanger (SR'), and the intercooler (IC'), respectively, by way of conduits (22'), (19') and (18'). This heated water is in this exchanging tower allowed to contact with the compressed air in the manner of counterflow so as to produce a mixture of compressed air/steam in which partial pressure of steam is increased for admission to the high temperature regenerator (R'$_1$) through conduit (10'). The part of the water which has been cooled by contact operation is routed through a conduit (20') to the self-heat-exchanger (SR'), the regenerator (R'$_2$), and the intercooler (IC'), respectively through conduits (23') (21') and (24') and, after being heated upon absorbing the heat there, is recycled to the exchanging tower (EXT'). The mixture of compressed air/steam introduced into the high temperature regenerator (R'$_1$) performs heat absorption there together with compressed air supplied, as required, directly from the compressor (AC'$_2$) through the conduit (8'), and is admitted to the combustion chamber (CC') by way of a conduit (11'). To the combustion chamber (CC') is also introduced through a conduit (25') fuel (1') that is preheated by the regenerator (R'$_3$). The combustion chamber burns fuel and compressed air to supply combustion gas, heated as required, to the turbine (ET') through a conduit (12'). The combustion gas undergoes an adiabatic expansion in the expansion turbine (ET') powering the first and the second air compressors (AC'$_1$) and (AC'$_2$) and the load (L') to which the turbine is connected, and are finally discharged as exhaust gas through a conduit (13). A portion of the exhaust gas is routed through a conduit (26') to the regenerator (R'$_3$) for preheating the fuel. The remaining exhaust gas are passed through a conduit (14') first to the high temperature regenerator (R'$_1$) and then through a conduit (15') to the low temperature regenerator (R'$_2$) in both of which the exhaust gas give off their heat for heat transfer. The exhaust gas is discharged as waste gas (27') through a conduit (16').

Referring then to FIG. 3, which is a flowsheet representing a gas turbine cycle of this invention having a two-stage operation in exchange towers, there are provided tow-stage exchanging tower (EXT'$_1$ and EXT'$_2$) from between which is produced water for use as the cooling medium to absorb the heat of the turbine exhaust gas. This arrangement is intended to enhance heat recovery of the gas turbine cycle. When a part of the compressed air produced by the air compressor (AC'$_2$) is passed into the high temperature regenerator (R'$_1$), it undergoes a loss of pressure during the process of heat exchanging. In order to compensate for this pressure loss, accordingly, an additional air compressor (AC'$_3$) is included. Apart form the above described modifications, this regenerative gas turbine cycle is substantially similar to that of FIG. 2.

Figure 4:
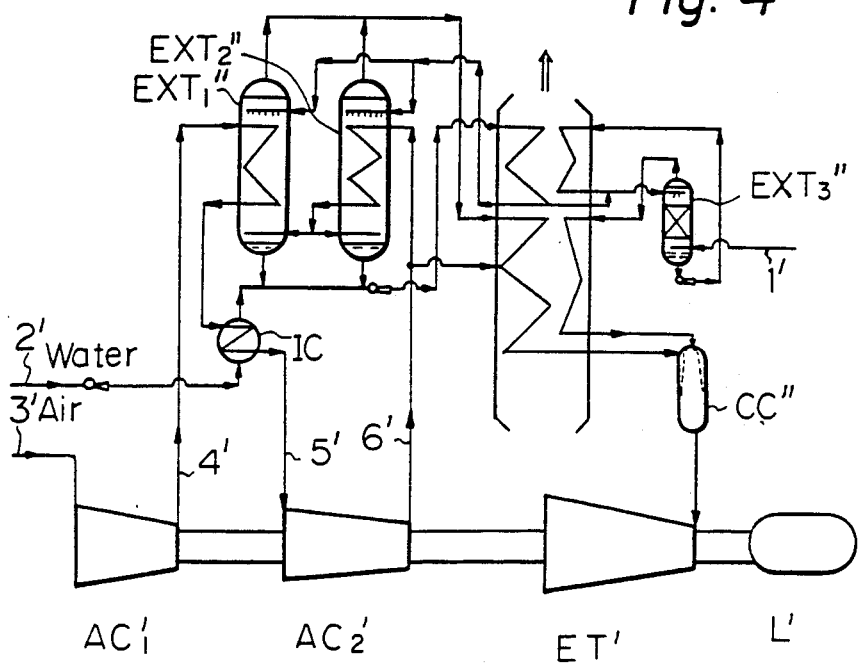

FIG. 4 is a flowsheet showing still another embodiment in accordance with the present invention in which each one of a pair of exchange towers EXT"$_1$ and EXT"$_2$ includes an indirect regenerator corresponding to a part of the intercooler (IC') and the self-heat-exchanger (SR') illustrated in FIGS. 2 and 3 therein. FIG. 4 illustrates an exchange tower (EXT"$_3$) in which fuel such as NG functions as air discribed above in connection with exchange towers EXT$_1$ or EXT$_2$ in FIGS. 1–3. In FIG. 4, the basic elements of the system are same as those of the embodiment illustrated in FIGS. 2 and 3, so are designated by the same numerals.

As is apparent from the above description of one preferred embodiment of the present invention made in conjunction with a flowsheet, the gas turbine cycle is characterized in that not only heat recovery of the turbine exhaust gas but also (a) intercooling of the compressor, and/or (b) precooling of the compressed air for the contact operation, are carried out by the water which is obtained by the contact between the water and a part of or the whole of the compressed air. Various emdofications are possible without departing from the principle of this method, for example, the use of fuel together with water as the cooling medium for intercooling, operation on the principle of reheat cycle, and the addition of a condenser to recover water contained in the waste gas. In addition, the gas turbine of this invention provides a desirable relationship of compression ratio a lower rate of reduction with increasing compression ratio compared with comventional gas turbine cycle. In addition, the advantages are greater in a reheat cycle or at high levels of specific power.

Although the principle of the regenerative gas turbine cycle of this invention has been discussed with the aid of a flowsheet representing one preferred embodiment, it is necessary for practical purposes to determine the range of amount of the compressed air and the water within which best use of the effect of heat and mass transfer as a result of the contact of water with compressed air can be made. It may seem desirable, if viewed in the interest of the highest ratios of heat recovery attainable, to use more than 60%, preferably more than 90% of the compressed air, further preferably all the compressed air (100%) for contact operation with the water to thereby cool the latter. However, because of the other limitations, for example, the amount of the compressed air required to contact with water to produce a given amount of cooled water to be used as the cooling medium for heat recovery of the self-heat-exchanger and the turbine exhaust gas, and for intercooling, the practical possible size of the device used for effecting such contact cooling, and the temperature of the turbine waste gas, in this particular embodiment the arrangement chosen has a means that diverts, as required, parts of the compressed air to the high temperature regenerator. It is also necessary to determine the amount of the water which contacts compressed air so as to form a mixture of compressed air/steam and is lost by evaporation, or the amount to replenish the regenerative cycle. The amount of the water normally is between 0.1–0.4 Kg-mole for 1 Kg-mole of the intaked air.

These optimum amounts or ranges of the water and the compressed air may vary with the conditions of the variations of this invention, such as; the use of fuel as the cooling medium for intercooling in addition to the water, operation on the principle of reheat cycle, and the addition of a condenser to recover water contained in the waste gas, and, the turbine inlet operating condition.

For example, in the embodiment illustrated in FIG. 1, with turbine inlet operating conditions of 6 ata. and 1,000° C., the optimum amount of the water for blending with the compressed air lies in the range of between from 0.1 to 0.2 Kg-mole, or more preferably, between from 0.11 to 0.15 Kg-mole per 1 Kg-mole of intaked air. And in the embodiment illustrated in FIG. 2, with turbine inlet operating conditions of 6 ata. and 1,000° C., the optimum amount of the water for blending with the compressed air lies in the range of between from 0.1 to 0.2 Kg-mole, or more preferably, between from 0.12 to 0.16 Kg-mole per 1 Kg-mole of intaked air. In addiition, the problem of pressure distribution in the compressors before and after the stage of intercooling may be considered in light of the intercooling effect to help reduce the compressor driving power.

The following table gives one example to provide a concrete picture of the advantages of the present invention.

EXAMPLE 1

(the embodiment illustrated in FIG. 1)

| (I) Conditions | |
|---|---|
| (a) Efficiencies | |
| Compressor adiabatic efficiency | $\eta_C = 0.89$ |
| Turbine adiabatic efficiency | $\eta_T = 0.91$ |
| Mechanical efficiency | $\eta_m = 0.99$ |
| Generator efficiency | $\eta_G = 0.985$ |
| Combustion efficiency | $\eta_B = 0.999$ |
| (b) Ambient air conditions at compressor inlet | |
| Temperature | 15° C. |
| Pressure | 1.033 ata. |
| Relative humidity | 60% |
| Flow rate  dry air | 1 Kg-mole/sec. |
| $H_2O$ | 0.0101 Kg-mole/sec. |
| (c) Fuel | |
| Kind | Natural gas |
| Temperature | 15° C. |
| High heating value (0° C.) | 245,200 kcal/Kg-mole |
| Low heating value (0° C.) | 221,600 kcal/Kg-mole |
| (d) Total pressure loss | 15.2% |
| (e) Replenishing water | |
| Temperature | 15° C. |
| Flow rate | 0.123 Kg-mole/sec. |
| (f) Turbine inlet conditions | |
| Pressure | 6 ata. |
| Temperature | 1,000° C. |
| (g) Minimum temperature difference for heat-exchanger | |
| High temperature regenerator $R_1$ | 30° C. |
| Low temperature regenerator $R_2$ | 20° C. |
| Fuel preheater $R_3$ | 30° C. |
| Intercooler IC | 20° C. |
| (h) Miscellaneous | |
| The compressive forces of the fuel, replenishing water and water at the bottom of the exchanging tower are assumed to be negligible while the total auxiliary power is taken as 0.3 percent of the generator output. Further, as to the cooling air for the turbine, the availability of low temperature compressed air in the regenerative gas turbine cycle is taken into account to determine its required amount. | |

The compressive forces of the fuel, replenishing water and water at the bottom of the exchanging tower are assumed to be negligible while the total auxiliary power is taken as 0.3 percent of the generator output. Further, as to the cooling air for the turbine, the availability of low temperature compressed air in the regenerative gas turbine cycle is taken into account to determine its required amount.

| (II) Results | |
|---|---|
| (a) Waste gas | |
| Temperature | 96.2° C. |
| Flow rate | 1.14 Kg-mole/sec. |
| (b) Compressor outlet temperature ($AC_2$) | 153° C. |
| (c) Sending end power output | 8500 KW |
| (d) Sending end thermal efficiency (LHV) | 49.5% |

EXAMPLE 2

(the embodiment illustrated in FIG. 2)

| (I) Conditions | |
|---|---|
| (a)-(d), (f) and (h) are the same as those of Example 1. | |
| (e) Replenishing water | |
| Temperature | 15° C. |
| Flow rate | 0.132 Kg-mole/sec. |
| (g) Minimum temperature difference for heat-exchanger | |
| High temperature regenerator $R_1$ | 30° C. |
| Low temperature regenerator $R_2$ | 20° C. |
| Fuel preheater $R_3$ | 30° C. |
| Intercooler IC | 20° C. |
| Self-heat-exchanger (SR) | 20° C. |
| (II) Results | |
| (a) Waste gas | |
| Temperature | 82.7° C. |
| Flow rate | 1.15 Kg-mole/sec. |
| (b) Compressor outlet temperature ($AC_2$) | 148° C. |
| (c) Sending end power output | 8690 KW |
| (d) Sending end thermal efficiency (LHV) | 50.2% |

What is claimed is:

1. A regenerative gas turbine cycle system with water addition wherein that recovery is carried out by both a mixture of compressed gaseous medium/steam and cooled water which are obtained through a contacting operation, said system comprising:
   a gas turbine for production of power;
   a compressor driven by the gas turbine for compressing a gaseous medium to a predetermined pressure;
   a conduit for introducing the gaseous medium to the inlet of the compressor;
   a after-cooler for cooling a compressed gaseous medium for a contacting operation;
   a conduit for conducting compressed gaseous medium discharge from the compressor to the after-cooler;
   a contacting chamber for saturating steam into the compressed gaseous medium so that both a single-phase and multi-component mixture of compressed gaseous medium/steam (SPCM) and cooled water are obtained;
   a conduit for conducting compressed gaseous medium from the after-cooler to the lower portion of the contacting chamber;
   at least two regenerators located in series in the line for discharging gas from the gas turbine;
   conduits for introducing the water accumulated in the bottom of the contacting chamber through the second regenerator and the after-cooler to the upper portion thereof;
   a conduit for introducing supplemental water to a circulating line;
   a conduit for conducting the SPCM from the top of the contacting chamber to the first regenerator;
   a conduit for conducting the heated mixture from the first regenerator to the combustion chamber;
   a conduit for introducing a fuel to the combustion chamber;
   a conduit for conducting the burned gas discharged from the combustion chamber to the inlet of the gas turbine; and
   a conduit for discharging the exhaust gas through said at least two regenerators.

2. A regenerative gas turbine cycle system with water addition according to claim 1 wherein said compressor comprises a multi-step compressor and is provided with an intermediate cooler for transferring the heat of the intermediate compression of the gaseous medium to a part of the cooler water from the bottom of the contacting chamber and the supplying water passing through associated conduits.

* * * * *